May 18, 1965
R. W. SMITH
3,184,201
INSERT FOR BEVERAGE CONTAINER SUPPORT
Filed Sept. 24, 1962
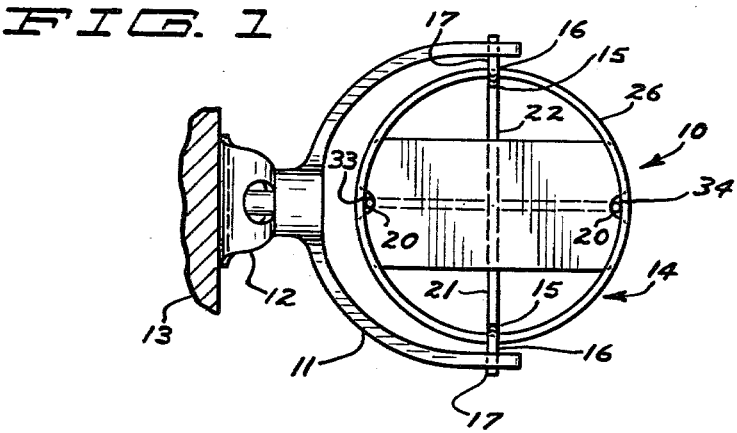
FIG. 1
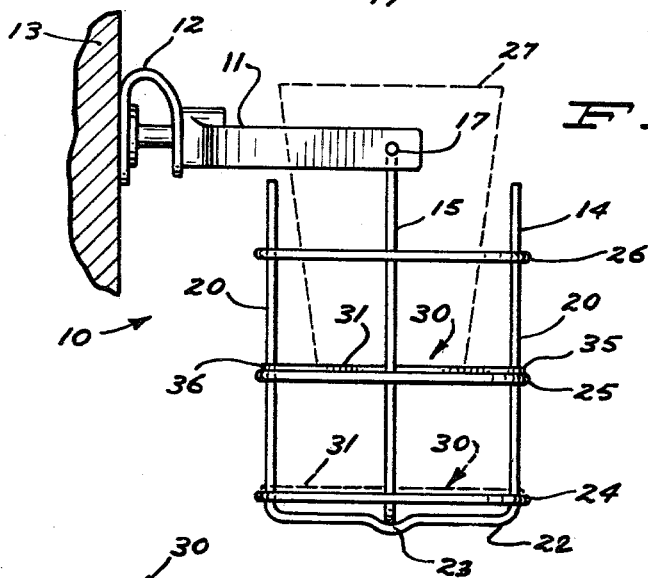
FIG. 2
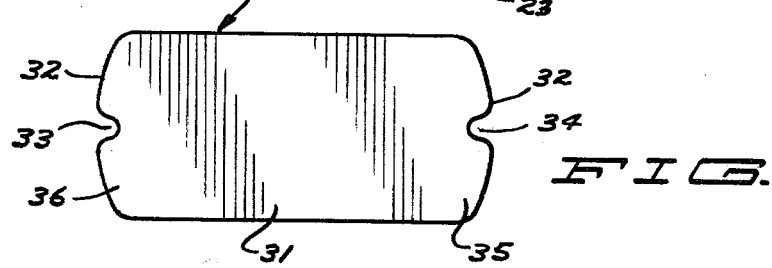
FIG. 3
FIG. 4
INVENTOR.
ROBERT W. SMITH
BY
Dugger, Braddock, Johnson & Westman
ATTORNEYS United States Patent Office 3,184,201
Patented May 18, 1965

3,184,201
INSERT FOR BEVERAGE CONTAINER SUPPORT
Robert W. Smith, Mound, Minn., assignor to Aladdin Manufacturing Company, Minneapolis, Minn., a corporation of Minnesota
Filed Sept. 24, 1962, Ser. No. 225,507
3 Claims. (Cl. 248—311)

The present invention has relation to beverage container supports and more particularly to an insert which will fit into a standard beverage container support to permit the support to accommodate either a tall or a short glass.

At the present time there is on the market a beverage container or glass support for use in boats which is comprised of a wire basket suspended from a bracket. The basket is made of sufficient size to accommodate tall glasses and cans. However, when short glasses are used, considerable difficulty is encountered in removing the glasses from the basket. In order to overcome this difficulty a false bottom is provided.

The false bottom is comprised of a flexible plate which can be adjusted upwardly and downwardly in the beverage container support as desired.

It is an object of the present invention to present an adjustable bottom insert for a beverage container support to provide for accommodation of glasses of different size.

In the drawings,

FIG. 1 is a top plan view of beverage container support having an insert made according to the present invention installed therein;

FIG. 2 is a side elevational view of the device of FIG. 1;

FIG. 3 is an enlarged top plan view of an insert for a beverage container support made according to the present invention; and FIG. 4 is a side elevational view of the device of FIG. 3.

Referring to the drawings and the numerals of reference thereon, a beverage container or glass support illustrated generally at 10 includes a member 11 which in turn is mounted into a bracket 12 that is fixedly attached to the side of a boat 13. The member 11 holds a wire basket 14. The basket 14 is comprised of a pair of upright support members 15, 15 which have ears 16, 16 that are pivotally mounted as at 17 in the support 11.

A second pair of upright members 20, 20 are positioned at 180 degrees to the first pair of upright members 15, 15. The upright members 15, 15 are joined together by a bottom cross member 21 and the upright members 20, 20 are joined together by a bottom cross member 22. The cross members 21 and 22 meet as at 23 and are fastened together.

First, second and third annular rings 24, 25 and 26, respectively, are fixedly attached to and spaced along the upright members 15 and 20. As can be seen a glass illustrated in dotted lines at 27 will fit within the annular rings and be supported in the wire basket 14.

The normal wire basket, as shown in FIG. 2 is too deep to support a glass such as that shown in 27. The glass would normally rest on the bottom cross members 22 and 23 and would be very difficult to remove from the wire basket.

In order to overcome this difficulty the device of the present invention was advanced. A beverage glass or container support insert 30 is comprised as a flat plate-like member 31 made of a flexible material, such as polyethylene, and having rounded end edge surfaces 32, 32. The edge surfaces 32, 32 are of the same configuration as the outside of the annular rings 24, 25 and 26. A pair of slots 33 and 34, respectively, of configuration to fit partially around the upright end members 20, 20, as shown in FIG. 1, are provided in the insert. The edge portions 35 and 35, respectively of the member 30 then will rest on one of the rings 24, 25 or 26 as desired. The plate-like member 31 then forms a support for a glass, such as that illustrated in dotted lines 27. As can be seen the member 30 is positioned to rest on middle ring 25. In this position the short glass 27 will extend upwardly far enough so that it can be removed from the wire basket 14 without difficulty.

If tall glasses or cans are to be used the member 30 may be bent in the middle so that the edge portions 35 and 36 are disengaged from the ring on which they are resting. The member may then be moved downwardly, for example to ring 24 in order to support a tall glass or can.

The slots 33 and 34 prevent the support from twisting and moving during use. Thus the member is securely retained in the wire basket 14 and will continue to function under all conditions of normal use.

The device can be easily moved from ring to ring as desired and thus the removal of short glasses from the beverage container support is facilitated.

What is claimed is:
1. The combination with a beverage container support comprising a basket having a plurality of annular rings vertically spaced and attached to at least one pair of diametrically opposite upright parallel wire support members of: a false bottom for said basket comprising a thin, flexible substantially flat member made of a material having the properties of polyethylene, said flat member being extended between said upright support members of said basket and supported on one of said support rings, the end surfaces of said false bottom having slots provided therein receiving said upright support members.
2. The combination as specified in claim 1 wherein said flat member can be bent to pass through the area defined by said annular ring.
3. The combination as specified in claim 2 wherein the end edge surfaces of said flat member form portions of a cylinder substantially the same diameter as the outside edge of said annular rings.

References Cited by the Examiner
UNITED STATES PATENTS
2,893,675 7/59 Smith et al. _____ 248—223
2,926,879 1/60 Dietrich _____ 248—311

CLAUDE A. LE ROY, Primary Examiner.
FRANK L. ABBOTT, Examiner.